July 23, 1946.     M. KLOSE     2,404,504
ROTARY LAWN TRIMMER
Filed Oct. 6, 1944
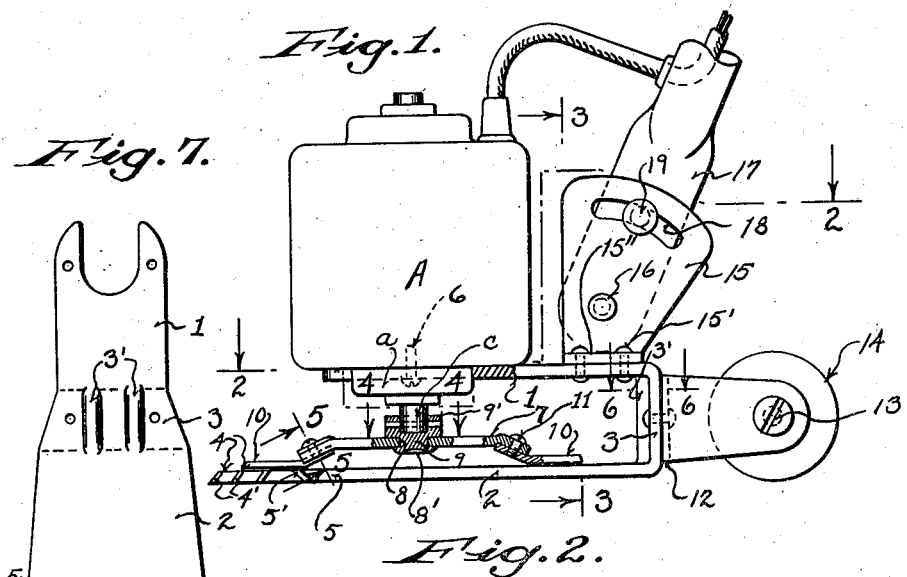
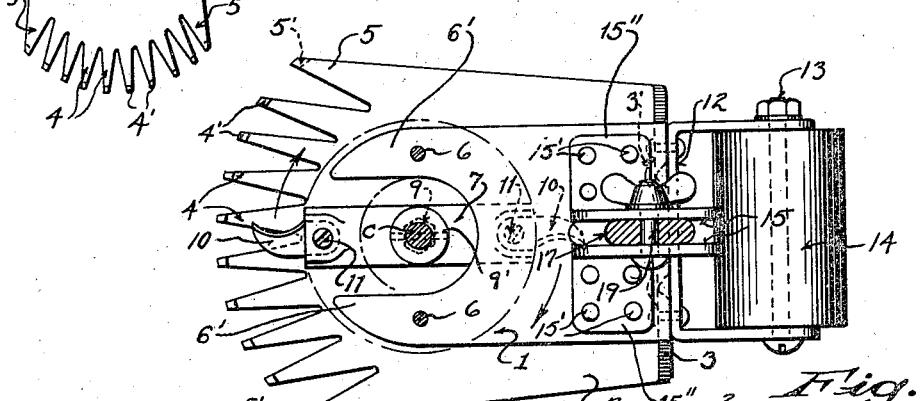
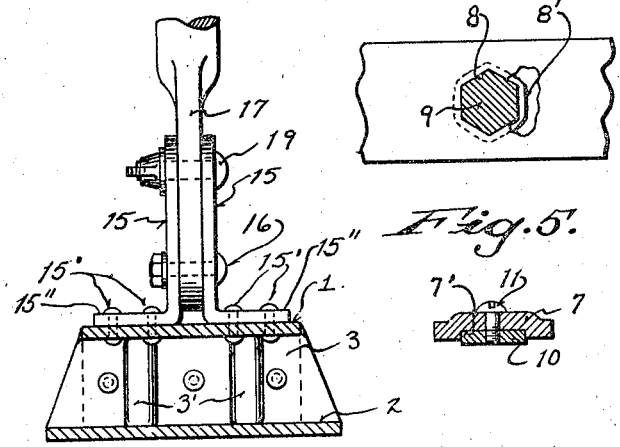
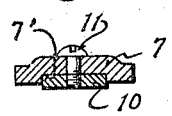
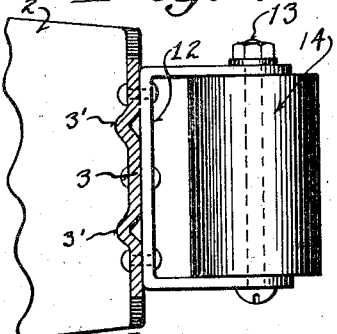
INVENTOR
MILTON KLOSE
ATTORNEYS Patented July 23, 1946

2,404,504

UNITED STATES PATENT OFFICE 2,404,504

ROTARY LAWN TRIMMER

Milton Klose, Manitowoc, Wis.

Application October 6, 1944, Serial No. 557,512

1 Claim. (Cl. 56—25.4)

My invention refers to motor driven rotary edge trimmers for lawns and it has for its object to provide a simply constructed and efficient trimmer, wherein the parts will require a minimum of finishing and may be assembled quickly and securely.

Specific objects of my invention are:

To provide a vertically positioned motor mounted upon a U shaped supporting frame, wherein a leg of which forms a shear blade.

To provide a one piece motor carrying U shaped supporting frame, the lower leg of which, at its edge, is formed with grass collecting fingers.

To provide a motor carrying U shaped frame, a lower leg of which projects beyond the motor and is formed with grass collecting fingers and with a rotary cutting blade between the legs of said frame, whereby it is protected.

To provide a one piece U shaped frame, having its legs connected by a back web, reinforced by a bracket for carrying a supporting roller.

To provide a one piece U shaped frame, the lower leg of which terminates with fingers and the upper leg with a fork attachable to the end face of a motor.

To provide a clip mounted upon the upper leg of a U shaped frame support, with a clip for pivotal connection to a handle and with means for adjusting and securing the handle in said adjusted positions. The clip and handle being rearwardly disposed with relation to a motor secured to the upper leg of the frame, whereby said motor serves as a guard for the adjustable handle parts.

To provide a hub secured to the motor shaft having a polygonal shank adapted to be secured to the spokes of a knife, it being understood that the polygonal shank is fitted in a corresponding opening in the spokes.

With the above and other minor objects in view, my invention consists in certain peculiarities of construction and combination of parts as will be hereinafter fully set forth with reference to the accompanying drawing and subsequently claimed.

In the drawing:

Figure 1 represents a side elevation of an edge trimmer embodying the features of my invention, with parts broken away and in section to more clearly illustrate structural features.

Figure 2 a plan view of the same, partly in section, as indicated by line 2—2 of Figure 1.

Figure 3 a detailed cross section illustrating the frame and clip attaching means for the handle, the same being indicated by line 3—3 of Figure 1.

Figure 4 a detailed sectional plan view illustrating the motor shaft hub attaching means to the knife spoke, the section being indicated by line 4—4 of Figure 1.

Figure 5 a detailed cross section through the spoke and knife illustrating the upset seat for said knife, whereby the same is held against twisting by a single screw, the section being indicated by line 5—5 of Figure 1.

Figure 6 a fragmentary cross sectional plan view of the ribbed web portion of said frame reinforced by a roller carrying bracket. And Figure 7 a plan view of the one piece U shaped frame or bracket illustrating the blank prior to folding in the form of a U shaped supporting frame.

Referring by characters to the drawing, 1 indicates the upper leg of a U shaped frame and 2 the lower ground leg, which legs are spaced apart and connected by a ribbed web 3. The front edge of the frame is formed with a plurality of grass collecting fingers 4 and a pair of outer fingers 5, which outer fingers serve as dividers and, as noted in Figure 1 of the drawing, they terminate with upwardly inclined beveled ends 5', whereby they will ride freely over the surface of the lawn. The collecting fingers between the dividers are formed with downwardly beveled ends 4', which serve as means for picking up the blades of grass and directing them into the throats between said fingers preparatory to being severed by a rotary knife.

As shown particularly in Figure 2, the upper leg frame 1 terminates in the form of a spanner to receive the lower end face of a vertically positioned electric motor A. Said lower face has extending therefrom a circular boss $a$ which snugly fits between the spanner forks 6' of the frame, and the face of the motor is secured to the forks of said frame by screws 6—6.

Mounted between the legs of the frame is a spoke or arm 7 having a polygonal central aperture 8 therein, which is fitted to a correspondingly shaped shank 9 of a hub 9', which hub is secured to the end of the motor shaft $c$. The arm 7 is secured by an upsetting head 8' at the end of the shank 9, whereby a rigid and simple connection is effected between the rotary knife arm and motor shaft.

The ends of the arm 7 are formed with countersunk beds 7' for the reception of shanks of knives 10, preferably of the hook form, and which knives are spaced slightly from the juxtaposed face of the frame ground leg, whereby friction between the shear fingers and knives is eliminated. As shown, the shanks of the knives, due to their bed connection with the arm, are secured each by a single screw 11.

The web 3 of the frame is strengthened by vertical ribs 3' and further reinforced by the base of an eared bracket 12, which bracket is riveted to the web and its ears are adapted to receive a bolt 13 upon which is loosely mounted a supporting roller 14.

Mounted rearwardly of the motor is a pair of parallel clips 15 having bases 15" which are riveted at 15' to the upper face of the frame leg 1, and said clips are formed with apertures for the reception of a pivot bolt 16 for the shank 17 of a handle. Spaced from the pivot bolt, the clips are formed with concentric slots 18 for the reception of a clamping bolt 19 which passes through the slots, and through its thumb nut can be readily tightened to prevent slippage of the handle back or forth after it is adjusted.

It will be noted that the one-piece frame has its upper spannered leg directly secured to the base of the motor and the space between the frame legs is entirely clear back to the web 3, with the exception that the motor shaft, and knife arm connected thereto, is the only element between the clear throat of the frame. Hence, the knife arm serves not only to cut the material, but also serves as a rotary deflector, whereby the throat of the frame is cleared of all cut material which would otherwise choke between the associated frame legs.

It will also be noted that the eared bracket not only serves as a reinforcing element for the frame, but it carries a supporting roller positioned rearwardly of the frame, whereby the trimmer may be manipulated to raise or lower the flared fingered edge of said frame, so as to control the depth of cut.

From the foregoing description it will be noted that the trimmer may be conveniently handled in its operation and is supported by the roller at its heel, and, under certain conditions, the machine may be rocked upon said roller. It should also be understood that I employ, what may be termed, a streamlined housing for the entire tool, which housing will prevent collection of grass between the parts and also serve as a safety medium, bearing in mind that the knife is rotated at a high speed.

While I have shown one exemplification of my invention minutely as to detail, it is understood that such details may be varied within the scope of the claim.

I claim:

An edge trimmer comprising a motor having a shaft extended below its base, a frame folded upon itself to form an upper leg terminating with a spanner nested about the motor shaft, securing means connecting the spanner leg and motor base, a web depending from the rear end of the upper leg merged into the lower ground leg of said frame and flared at its outer edge to form a plurality of fingers, the said web being of less width than the spread of the fingers, whereby a narrow throat is developed to shed cut material, a single arm secured to the motor shraft terminating with knives above the face of the lower frame leg, the said knife arm serving as a rotary cut material deflector for clearing the throat of the frame, an eared bracket secured to the frame web, whereby said web is reinforced, a roller journaled in said bracket, its periphery being below the bottom face of the lower frame leg, and a handle extending from the upper frame leg for guiding and rocking the edge trimmer upon the roller.

MILTON KLOSE.